R. H. BURGESS.
RESILIENT WHEEL.
APPLICATION FILED MAY 27, 1913.
1,131,468.
Patented Mar. 9, 1915.
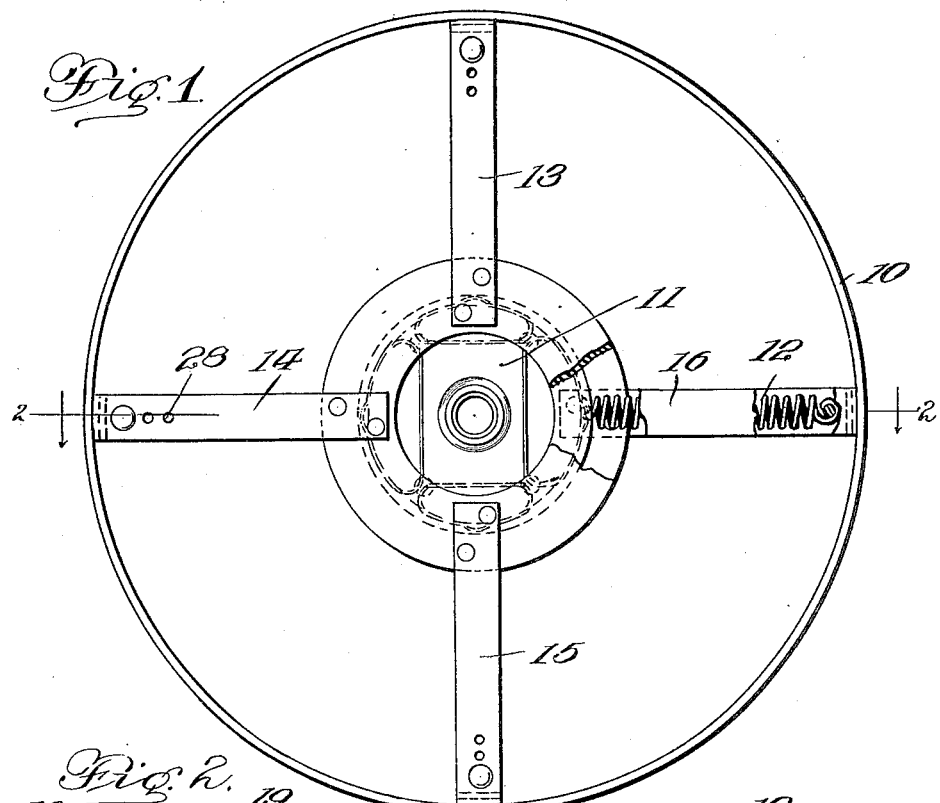
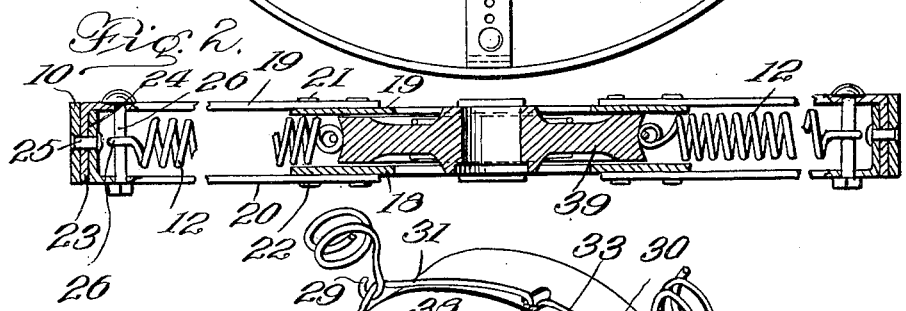
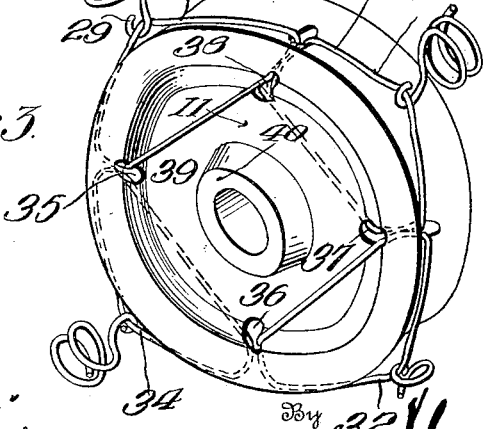
Inventor
R. H. Burgess

UNITED STATES PATENT OFFICE.

RICHARD H. BURGESS, OF MULLIN, TEXAS.

RESILIENT WHEEL.

1,131,468.  Specification of Letters Patent.  Patented Mar. 9, 1915.

Application filed May 27, 1913. Serial No. 770,248.

*To all whom it may concern:*

Be it known that I, RICHARD H. BURGESS, citizen of the United States, residing at Mullin, in the county of Mills and State of Texas, have invented certain new and useful Improvements in Resilient Wheels, of which the following is a specification.

This invention relates to new and useful improvements in resilient wheels and as its principal object aims to provide a device of this character which may be cheaply manufactured, will be durable and efficient in its action and may be readily applied to any vehicle running gear.

A further object is to construct a resilient wheel in which the hub is yieldably suspended at the center of a relatively rigid tire or rim.

A still further object is the provision of a resilient wheel in which the rim or tire is formed of relatively rigid steel so that while the hub, which is yieldably suspended in the center of the tire, may be free to move for the purpose of absorbing shocks which are imparted to the running gear, the tire will, nevertheless, be unyielding and will engage the roadbed in the same manner as does any ordinary wheel tire.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a side elevation of the wheel with parts broken away showing the various elements in operative assembled relation. Fig. 2 is a section on the line 2—2 of Fig. 1, and Fig. 3 is a perspective view illustrating in detail the hub of the wheel.

Proceeding now to a description of the drawings and referring particularly to Figs. 1 and 2, in which the invention is best illustrated as an entirety, the numeral 10 designates a metallic tire or rim which is relatively wide in its preferred embodiment and is constructed of relatively rigid steel. In the center of this tire 10 is yieldably suspended a hub designated by the numeral 11. In suspending this hub there are provided a number of helical springs 12, the inner terminals of which are detachably connected to the hub and the outer terminals of which are detachably connected to the tire 10. There are preferably four of these spring members provided and when such a number is employed they are quadrantly spaced and arranged with their longitudinal axes extending as radii of the tire.

As a means for protecting the springs 12 and also for holding the hub 11 against transverse movement there have been provided four quadrantly spaced pairs of radially extending guard-plates as at 13, 14, 15 and 16. As stated, these pairs of guard-plates extend as radii of the wheel and are of such length that their inner ends terminate short of the tire center. To the inner terminals of these guard-plates is secured a pair of circular housing-plates 17 and 18. Upon reference to Fig. 2 it will be seen that the individual plates of each pair of guard-members are arranged to extend in parallel spaced relation to each other. In Fig. 2 the individual plates of the pair 14 are designated by the numerals 19 and 20. The inner terminals of these members are riveted or otherwise secured as at 21 and 22, respectively, to the housing-plates 17 and 18. The outer terminals of the members 19 and 20 are bent at right angles to produce attaching lugs as at 23 and 24. These attaching lugs 23 and 24 are centrally apertured, the apertures being adapted to register with the members 19 and 20 are assembled so that a rivet or similar fastening device 25 may be inserted through the lugs and pass through the tire 10 for properly securing the outer terminals of the members 19 and 20 to the tire. Each spring-member 12, is, as previously described, helical in conformation, its outer terminal being bent to produce a hook 26 which is engageable over a transversely extending bolt 27 which is positioned adjacent the outer terminals of the members 19 and 20. A bolt similar to the bolt 27 is of course, provided for each pair of guard members and in the preferred embodiment of the invention these bolts are adjustable toward and away from the center of the wheel by insertion through the series of registering apertures 28. It will be apparent that by adjusting the bolt 27 the tension of the springs may be varied in accordance with the weight of the load carried by the wheel.

The inner terminals of the springs 12 are bent to produce hooks 29 which are substantially similar to the hooks 26. These hooks 29 are engageable with the attaching bails or wires 30 carried by the hook 11. In the preferred embodiment shown in the drawings, four attaching bails 31, 32, 33 and 34 are employed, each being formed from a single length of relatively heavy wire. At four quadrantly spaced points in the hub are formed bores or openings as at 35, 36, 37 and 38, these openings communicating both with the periphery and with the two faces of the hub. It is thus possible to apply the diametrically opposed bail members 31 and 32, so that their inner portions bear against one face of the hub while the inner portions of the bail members 33 and 34 bear against the opposite face of the hub. The purpose in arranging the bails in this manner is to equalize the pull on the hub at the four points of attachment of the springs so that the hub will be maintained in the plane of the rim 10.

The hub is provided with a grooved or channeled periphery so that the outer portions of the bails will be held against lateral shifting. Each face of the hub is cored out, as indicated at 39, to produce a chamber in which the inner portions of the bails will be received so that they will not contact with the inner end of the axle skein. An outstanding boss 40 is, of course, formed on each face of the hub as a result of the formation of the cored chamber 39. These members 40 are adapted to bear against the inner end of the axle skein in a well-known manner. It is desirable at this point to direct attention to the fact that by forming the boss 40 on each face of the hub it is possible to reverse the wheel as regards its relation to the axle of the vehicle.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

What I claim is:—

1. A resilient wheel including a rim, spaced radially extending guard-plates arranged in pairs, an inwardly extending apertured ear formed on the outer terminal of each guard plate, the ears of each pair of guard plates being adapted to mate, a bolt extending through each pair of mating ears and passing through the rim whereby the guard plates are secured at their outer terminals to the rim, bolts extending transversely between the plates of each pair and adjustable longitudinally thereof, housing plates carried by the inner terminals of the guard-plates, a hub arranged between the housing plates, a plurality of helical springs detachably secured at their inner terminals to the hub, and a hook formed on the outer terminal of each spring whereby the springs may be detachably secured at their outer terminals to the bolts, said springs being each arranged between one of the pairs of guard-plates.

2. A resilient wheel including a rim, spaced radially disposed guard-plates arranged in pairs, a single bolt for securing the terminals of each pair of guard plates to the rim, annular housing plates carried by the inner terminals of the guard-plates and arranged in parallel spaced relation to each other, a hub mounted between the plates, radially extending helical springs arranged each between one pair of guard-plates, bolts passing transversely through the guard-plates adjacent the outer terminals thereof and adjustable longitudinally with respect to the guard plates, hooks formed on the outer terminals of the springs, said hooks being detachably engageable with the bolts, said hooks being adapted to be disengaged from the bolts without requiring the removal of the bolts, a hub formed with a plurality of apertures, and flexible members passing through the apertures and forming bails adapted to receive the lower terminals of the springs.

3. A resilient wheel including a rim, a hub, said hub being annular in shape and having a peripheral channel and having its faces cored to produce annular recesses, bail receiving bores formed in the hub and each opening at one terminal through the periphery of the hub and at its other terminal through one of the recesses, and bail members each extending through a pair of the bores, a portion of each bail being disposed in one of the recesses, a portion of each bail being disposed in the peripheral channel of the hub, and a plurality of helical springs for yieldably suspending the hub in the rim, said springs being detachably secured at their outer terminals to the rim and having hooks at their inner terminals detachably engageable with the portions of the bails which lie in the peripheral channel of the hub.

4. A resilient wheel including a rim, a hub, said hub being annular in shape and having a channel formed in its periphery, an annular recess formed in each face, and a plurality of bail receiving bores opening at their outer terminals through the channel and at their inner terminals into both of the recesses, and means for yieldably suspending the hub in the rim, said means including a plurality of spring members and a plurality of bail members, each extending through a pair of the bores in a hub member and each having a portion disposed in one of the recesses of the hub and a portion disposed in the channel thereof, those bails which are diametrically opposed having their portions which are disposed in a recess arranged in the same recess, and those bails which are adjacent having their positions, which are disposed in a recess, located in the recesses of opposite faces of the head.

In testimony whereof I affix my signature in presence of two witnesses.

RICHARD H. BURGESS. [L. S.]

Witnesses:
J. B. APPLEWHITE,
RUTH KIRKPATRICK.

Copies of this patent may be obtained for five cents each, by addressing the "Commissioner of Patents, Washington, D. C."